United States Patent
Kamel (10) Patent No.: US 10,089,507 B2
(45) Date of Patent: Oct. 2, 2018

(54) SCANNING INSTRUMENT ACCESSORY (71) Applicant: SpeedThought Consulting, Inc., Toronto, Ontario (CA)

(72) Inventor: John-Pierre Kamel, Toronto (CA)

(73) Assignee: SPEEDTHOUGHT CONSULTING, INC., Toronto, Ontario (CA)

(*) Notice: Subject to any disclaimer, the term of this patent is extended or adjusted under 35 U.S.C. 154(b) by 0 days.

(21) Appl. No.: 15/482,220

(22) Filed: Apr. 7, 2017

(65) Prior Publication Data

US 2017/0300730 A1  Oct. 19, 2017

Related U.S. Application Data (60) Provisional application No. 62/323,083, filed on Apr. 15, 2016.

(51) Int. Cl.
  *G06K 19/00* (2006.01)
  *G06K 7/10* (2006.01)
  *G06K 19/077* (2006.01)

(52) U.S. Cl.
  CPC ... *G06K 7/10891* (2013.01); *G06K 19/07758* (2013.01)

(58) Field of Classification Search
  USPC .......... 235/435, 439, 454, 487, 492
  See application file for complete search history.

(56) References Cited

U.S. PATENT DOCUMENTS

| | | | |
|---|---|---|---|
| 5,275,364 A | 1/1994 | Burger et al. | |
| 9,055,144 B2 | 6/2015 | Yang et al. | |
| 9,170,473 B1* | 10/2015 | Li | F16M 11/28 |
| 2005/0279889 A1* | 12/2005 | Greene | B64C 3/54 |
| | | | 244/159.3 |
| 2010/0096463 A1* | 4/2010 | Perera | G06K 7/0004 |
| | | | 235/470 |
| 2017/0085284 A1* | 3/2017 | Ai | H04B 1/3888 |

FOREIGN PATENT DOCUMENTS

WO  WO 2017000027 A1 * 1/2017 ............ A45C 11/00

OTHER PUBLICATIONS

Delta, Retrosign—Extension Pole brochure, Sep. 2009, published on-line, accessed on Apr. 6, 2015.
(Continued)

Primary Examiner — Matthew Mikels
(74) Attorney, Agent, or Firm — Ladas & Parry LLP

(57) ABSTRACT

An accessory for holding a scanning instrument, comprising: a sleeve to receive the scanning instrument; a fastener coupled to the sleeve to releasably secure the scanning instrument in the sleeve; a coupling mechanism having a first end and a second end, the first end rotatably coupled to the sleeve such that the sleeve rotates about an axis defined by the first end, the second end rotatably coupled to the first end such that the first end and the sleeve rotate about an axis defined by the second end; and an extension pole coupled to the coupling mechanism at the second end. In one embodiment, the coupling mechanism further comprises a motion inducer configured to induce movement of the sleeve with respect to the coupling mechanism and the extension pole.

15 Claims, 10 Drawing Sheets

(56) References Cited

OTHER PUBLICATIONS

Tapco Traffic & Parking Control Co., Inc., Retrosign GR3 Retroreflectometer brochure, undated, published on-line, accessed on Apr. 6, 2015.
Tapco Traffic & Parking Control Co., Inc., Retrosign GR3 Retroreflectometer presentation, undated, published on-line, accessed on Apr. 6, 2015.
Thermo Scientific, Simply Superior Handheld XRF brochure, 2007, published on-line, accessed on Apr. 6, 2015.
Aleis, One and Two Piece Handhelds webpage, accessed on Apr. 6, 2015.
Amazon, Telescoping Extension Pole product search, accessed on Apr. 6, 2015.

* cited by examiner

SCANNING INSTRUMENT ACCESSORY

REFERENCE TO RELATED APPLICATIONS

This application claims priority to U.S. Provisional Application 62/323,083, the contents of which are incorporated herein by reference.

FIELD OF THE INVENTION

The present application relates to an accessory for a scanning instrument. More specifically, the present application relates to a holder and extension accessories for use with a handheld radio-frequency identification (RFID) scanning instrument.

BACKGROUND OF THE INVENTION

Many different types of scanning instruments are currently used to obtain information about products, containers and/or other items of interest. For example, Radio-frequency Identification ("RFID") systems use electromagnetic fields to automatically identify and track tags that are attached to various objects. RFID tags contain electronically stored information that is released either upon collecting energy from a nearby RFID scanner's interrogating radio waves or from a local power source such as a battery: RFID scanning instruments receive released information from RFID tags and can store, present and/or transmit the information for use by a user. Unlike a barcode, RFID tags do not need to be within the line of sight of the scanning instrument, so RFID tags may be embedded in the objects to be tracked.

RFID systems typically use both fixed (i.e. stationary) and handheld portable scanning instruments to interrogate RFID tags. Unfortunately, many RFID scanning instruments have a limited range (e.g. <10 feet) within which they can interrogate a corresponding tag and subsequently receive information. Further, metal components positioned proximate to RFID tags can substantially interfere with RFID signals thereby making RFID systems difficult to use in settings where metal components are abundant.

Further, while line of sight is not necessary for the scanner to receive information from an RFID tag, in practice it is often insufficient to simply hold the scanner in front of the RFID tag in order to reliably pick up a signal. In order to maximize the chances that the RFID signal will be picked up and registered in the scanner, it is necessary to wave the scanner in front of the item containing an RFID tag. The most recommended motion is a sinusoidal motion in the shape of a "figure 8", which is done manually by the person holding the scanner. Such a sinusoidal motion creates a multipath environment covering various angles and exposures between the RFID tag and the scanner, and maximizes the chance of signal transmission between them.

Given the need for proximity between the RFID tags and the scanners, the complicating factor of possible interference by metal components such as shelving, and the necessity for sinusoidal movement in the vicinity of the RFID tags, the practice has been to do the scanning by hand. In large warehouses, this will involve a worker holding the scanner and waving it in front of the inventory as he or she walks slowly down an aisle in front of the shelving. In large warehouses or in retail settings when RFID tags are used to track products that are organized on metal racks, this results in limitations. For example, a user carrying a handheld scanning instrument attempting to access a tag positioned on a metal rack well above the ground may be required to climb a ladder or up to a raised platform in order to access the tags, thereby potentially exposing the user to a risk of falling. Further, it is time consuming to climb up and down ladders and to have to move them frequently to continue accessing tags which are located further down the aisle on high shelves. As well, a user attempting to access tags on low shelves close to the ground will be required to bend over for extended periods of time, which may result in back strain.

It can also become difficult or tiresome for a user to continue scanning the tags in a sinusoidal manner. This may eventually result in strain and injury to the wrist, elbow or shoulder joints.

Therefore, a need exists for a scanning instrument accessory to improve the portability of RFID scanners and other scanning instruments that have a limited usable range. Accordingly, a solution that addresses, at least in part, the above and other shortcomings is desired.

SUMMARY OF THE INVENTION

According to one aspect of the invention, there is provided an accessory for holding a scanning instrument, the accessory comprising: a sleeve to receive the scanning instrument; a fastener coupled to the sleeve to releasably secure the scanning instrument in the sleeve; a coupling mechanism having a first end and a second end and which is configured to allow rotational positioning of the sleeve and its contained scanning instrument in an orientation selected by the user, the coupling mechanism being connected by its first end to the sleeve, and the coupling mechanism being connected by its second end to an extension pole. The extension pole may be adjustable to different lengths depending on the needs of the user and the location of the items being scanned. The extension pole may further be equipped with a means of turning on or triggering the scanner, such as a button at the end proximate to the user that is wired to the scanner, or a wireless means of triggering the scanner such as through use of BLUETOOTH™ technology.

According to a further aspect of the invention, the coupling mechanism may comprise a first end and a second end, the first end being rotatably coupled to the sleeve such that the sleeve rotates about an axis defined by the first end, the second end rotatably coupled to the first end such that the first end and the sleeve rotate about an axis defined by the second end.

According to a further aspect of the invention, the coupling mechanism may additionally comprise a motion inducer configured to induce movement of the sleeve with respect to the coupling mechanism and the extension pole. The motion inducer may be configured to move the scanning instrument in a sinusoidal wave motion or other non-linear motion, as the user moves the scanning instrument and accessory in front of the items to be scanned. In order to achieve such a motion, the motion inducer may take the form of an embedded hydraulic spring attached to the coupling mechanism which will automatically create the necessary sinusoidal wave motion as the device is used.

According to a further aspect of the invention, the accessory for holding the scanning instrument may be mounted on a wheeled device to facilitate its movement in environments such as warehouses with long aisles and rows of shelving with product at various heights. The wheeled device may take any known form, such as a wheeled tripod stand, a cart, or a motorized buggy. Further, the scanning instrument may be mounted in the wheeled device at different heights, and at different angles, depending on the horizontal location of the products being scanned.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EMBODIMENTS

In the following description, details are set forth to provide an understanding of the invention. In some instances, certain features have not been shown or described in detail so as to not obscure the invention.

It should be noted that the term "couple" or "couples" is intended to mean either an indirect or direct connection. Thus, if a first device couples to a second device, that connection may be through a direct connection, or through an indirect connection via other devices and connections.

The present application provides a scanning instrument accessory for holding a scanning instrument. According to one embodiment of the application, the scanning instrument accessory includes a sleeve for receiving a scanning instrument, a fastener for releasably securing the scanning instrument in the sleeve, an extension pole for extending the scanning instrument from a user operating the scanning instrument accessory and a coupling mechanism for coupling the sleeve to the extension pole. In a further embodiment, the coupling mechanism includes a motion inducing mechanism to provide movement to the sleeve relative to the coupling mechanism and the extension pole.

Figure 1:
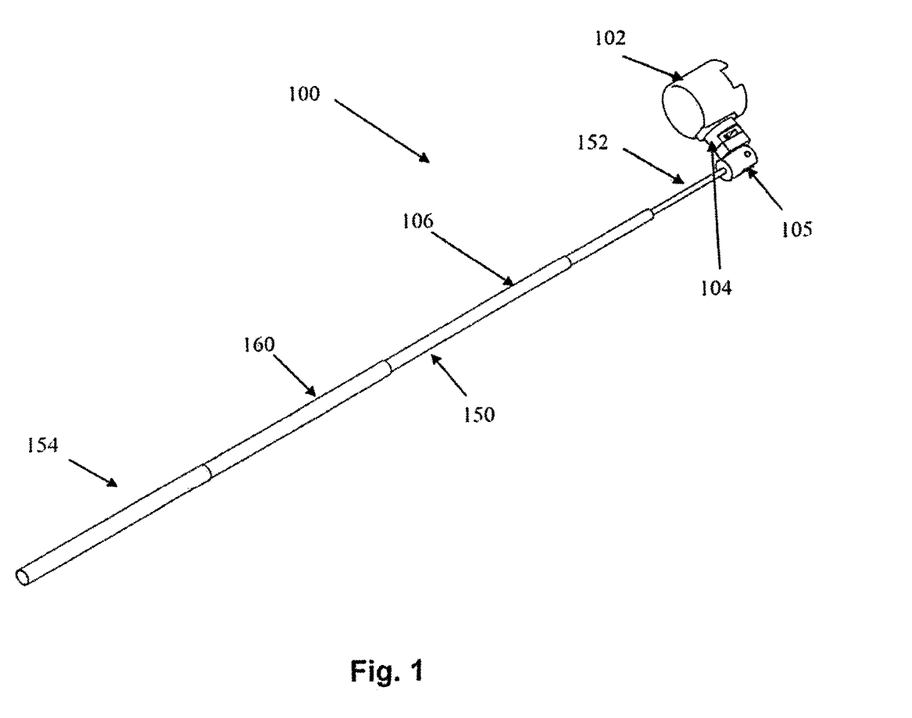
FIG. 1 is a perspective view illustrating a scanning instrument accessory in accordance with an embodiment of the invention.

FIG. 1 shows a perspective view of an embodiment of the scanning instrument accessory 100. A sleeve 102 receives a scanning instrument 101 (see FIGS. 8-10) such that the scanning instrument 101 is releasably secured in the sleeve by a fastener 103 (see FIG. 6). Sleeve 102 is coupled to extension pole 106 via coupling mechanism 104. In the embodiments shown in the figures, coupling mechanism 104 provides for rotation of sleeve 102 about at least two axes: a first axis defined by a first end 131 of the coupling mechanism 104 (see FIG. 6) and a second axis defined by the extension pole 106. The extent of rotation around either axis may be set by user by hand or by any other known means including electronically. Once an amount of rotation is set, the sleeve will hold that position until changed by user.

Coupling mechanism 104 may also take the form of a universal joint that permits rotation of sleeve 102 about multiple axes so that the scanning instrument 101 can be configured to face a wide range of orientations. In this way, the scanning instrument 101 can be more precisely aimed in a range of directions depending on the locations of the items to be scanned, relative to the location of metal components such as shelving. In this way, the user can orient the scanning instrument 101 so as to maximize the likelihood of reading the targeted RFID tags, and at the same time minimize interference by surrounding metal components.

Further, coupling mechanism 104 may also provide non-rotational movement of the sleeve 102 with respect to the coupling mechanism 104 and/or the extension pole 106 via a motion inducer 105. Motion inducer 105 is designed to slowly and smoothly move the sleeve 102 and its contained scanning instrument 101 back and forth in a sinusoidal motion when held in front of an item requiring scanning. Such movement creates a multipath environment which maximizes the opportunities for the scanner to perceive the RFID tags. The motion inducer may take a number of known forms, including a hydraulic spring or gas spring that facilitates smooth, controlled movement of the sleeve 102 and its contained scanning instrument 101.

In FIG. 1, motion inducer 105 is shown installed at an end of the extension pole 106, and is in turn connected to the coupling mechanism 104. Motion inducer may alternatively be installed between sleeve 102 and coupling mechanism 104. Either manner of installation is effective for facilitating the desired motion.

Motion inducer 105 may induce non-rotational movement of sleeve 102 with respect to coupling mechanism 104 and/or extension pole 106. The non-rotational movement induced by the motion inducer may be vibratory, oscillatory or the like and may be in any direction. In one embodiment, the movement induced by the motion inducer is parallel with the second axis as defined by the extension pole 106 such that movement of the sleeve 102 in a direction parallel with the second axis combines with lateral movement of the scanning instrument accessory 100 provided by a user travelling on the floor to provide movement of the sleeve 102 in a generally sinusoidal pattern.

In another embodiment, the motion inducer 105 may be a mechanical device that converts electrical signals from control electronics to a physical action or force via first end 131 of coupling mechanism 104. In other embodiments, the motion inducer may be a linear motor, a pneumatic actuator, a hydraulic actuator, a servo-controlled moving magnet actuator, or any other suitable device known in the art. In one embodiment, the amplitude and frequency of motion induced by the motion inducer may be adjusted by a user of the scanning instrument accessory 100.

As also shown in FIG. 1, extension pole 106 includes an upper end 152 and a lower end 154. The upper end 152 is connected to the sleeve 102 and scanning instrument 101. The lower end may be held by the user, or installed on a wheeled apparatus (not shown) in order to facilitate use of the scanning instrument accessory particularly in warehouse-like environments with rows of shelving containing items to be scanned at various heights. The wheeled apparatus may comprise many types of known devices including a wheeled tripod, a cart, or a buggy. The connection means of the extension pole 106 by its lower end 154 to the wheeled apparatus may be by any known means, as long as the connection is adjustable to allow the user to angle the extension pole 106 appropriately so that the sleeve 102 and its contained scanning instrument 101 may be used at various heights. The connection to the wheeled apparatus may also be rotatable and pivotable so that the user may cause the aforementioned sinusoidal movement of the scanning instrument 101 from the lower end of the extension pole 106, either in addition to the motion conferred by the motion inducer 105, or as an alternative to including a motion inducer 105 at the level of the scanning instrument 101.

FIG. 1 also illustrates a length-adjustable extension pole 106 constructed in accordance with the present application for cooperative engagement with coupling mechanism 104 and sleeve 102. Extension pole 106 comprises an elongate hollow body 150 having an upper end 152 and a lower end 154. The upper end 152 of the body 150 is secured to coupling mechanism 104 which rotatably supports sleeve 102. Upper end 152 of body 150 may couple to coupling mechanism 104 through any known coupling means. For example, in the embodiment shown in the figures, upper end 152 of body 150 has an internally threaded bore for mating with the coupling mechanism.

Further, as shown in FIG. 1, body 150 can comprise a plurality of elongate tubular members 160 made of a light weight material such as but not limited to a plastic, aluminum or carbon composite. The tubular members 160 are preferably hollow such that each tubular member 160 is mounted telescopically with respect to two adjacent tubular members 160. This telescopic configuration of the tubular members 160 provides telescopic extension to extension pole 106.

In one embodiment, extension pole 106 may comprise a mechanism (not shown) positioned at lower end 154 to allow a user of scanning accessory 100 to trigger the scanning instrument 101 retained in sleeve 102. In one example, extension pole 106 may include a button at lower end 154 connected via a wired connection to a triggering mechanism positioned within sleeve 102 to mechanically actuate a trigger on the scanning instrument 101. In another example, extension pole 106 may comprise a button or lever at lower end 154 wirelessly connected (e.g. via BLUETOOTH™) to the scanning instrument 101 to trigger the scanning instrument 101.

Figure 2:
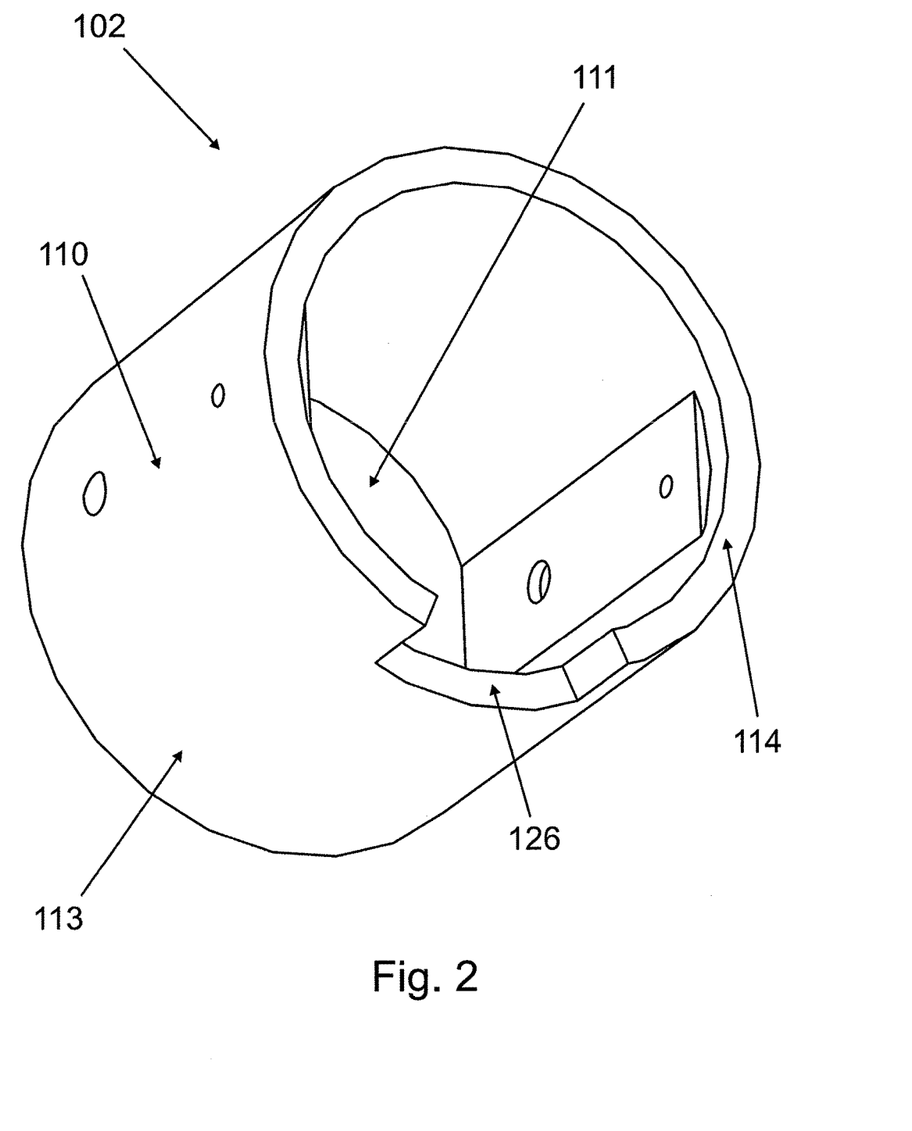
FIG. 2 is a perspective view of a sleeve of the scanning instrument accessory of the illustrated in FIG. 1.
Figure 3:
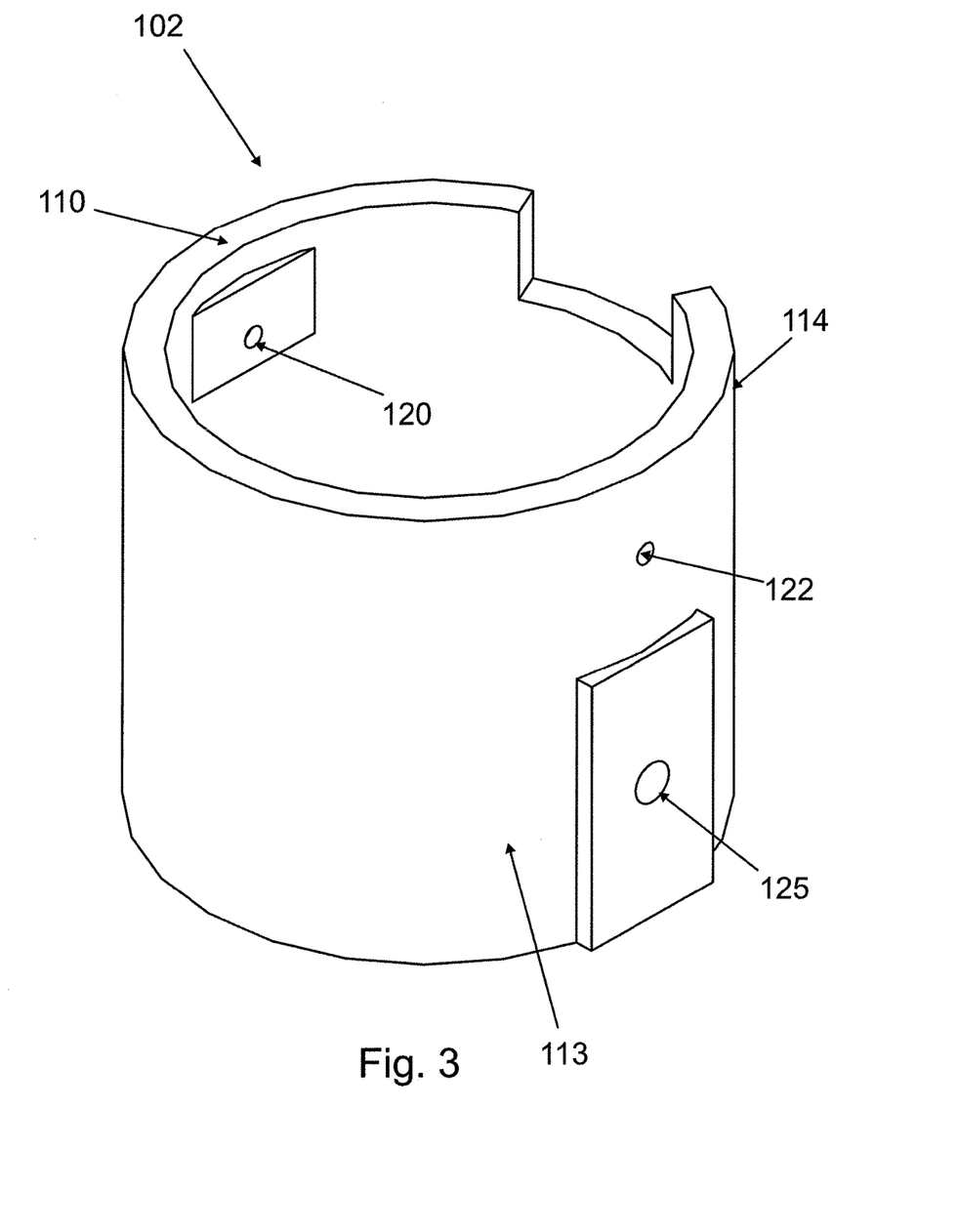
FIG. 3 is a second perspective view of the sleeve shown in FIG. 2.
Figure 4:
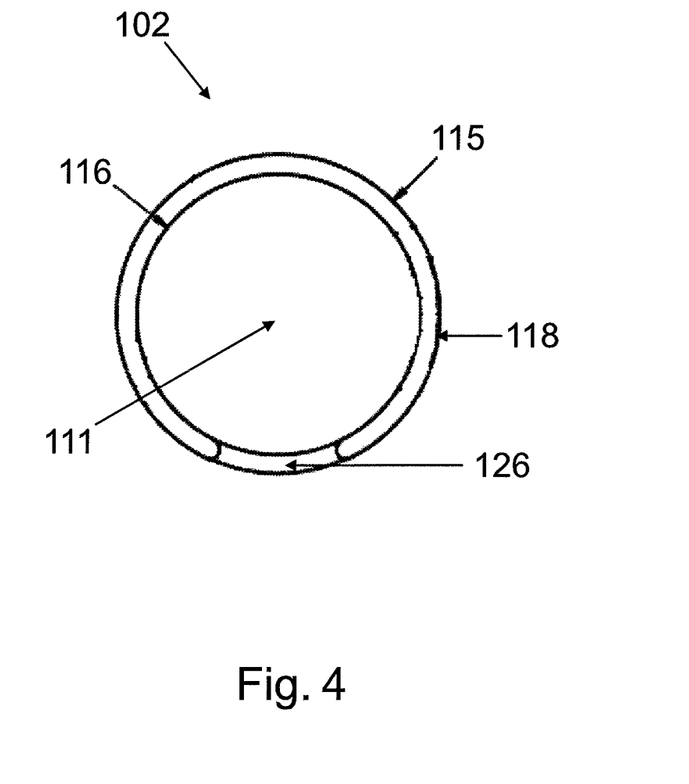
FIG. 4 is a top view of the sleeve shown in FIG. 2.

As shown in FIGS. 2-4, sleeve 102 may comprise a body 110 that is generally cylindrical in shape with a hollow inner space 111. Body 110 has an outer surface 115 and an inner surface 116 (see top view provided in FIG. 4) that are generally smooth and co-operate to form body 110. In the embodiments shown in the figures, body 110 has a substantially uniform thickness. Body 110 of sleeve 102 may be made of any rigid material, including but not limited to a polymer, aluminum or carbon composite material. According to one embodiment, body 110 of sleeve 102 is made of a rigid, light weight material such as a carbon composite.

Body 110 comprises a lower portion 113 and an upper portion 114. Upper portion 114 has a notch 126 formed therein as shown in FIG. 2. The notch 126 is shaped to receive a protruding portion (for example, a trigger portion) of the scanning instrument 101, as generally shown as part 107 in FIG. 10. In operation, upon insertion of the scanning instrument 101 into sleeve 102, the protruding portion 107 of the scanning instrument 101 may rest within the notch 126 of sleeve 102 and substantially fill the space provided by the notch 126.

In one embodiment, an area of the notch 126 is adjustable by way of a sliding mechanism (not shown) that is attached to or integral with body 110 of sleeve 102 and positioned about the notch 126. The sliding mechanism can slide over at least a portion of the open area of the notch 126 to reduce the area of the notch 126. The sliding mechanism allows sleeve 102 to be adjusted to accept scanning instruments 101 of various shapes and sizes. It should be noted that various other mechanisms known to a person skilled in the art beyond the sliding mechanism described above may be used to adjust the area of the notch 126 to accept handheld scanning mechanisms of various shapes and sizes.

Although body 110 is shown in the figures as generally cylindrical or tubular in shape with a hollow inner volume, cavity or space 111 formed therein, other shapes and configurations of body 110 can be used to retain the handheld scanning instrument 101. For example, sleeve 102 may be configured to be square, triangular, planar, or any custom shape in cross-section so long as a scanning instrument 101 may be releasably secured therein.

In the embodiment shown in FIGS. 2 and 3, upper portion 114 of body 110 has connection points or connectors 120 and 122 for coupling fastener 103 thereto. Connectors 120 and 122 are opposed and spaced from each other such that fastener 103 couples to sleeve 102 on opposed sides of body 110. Connections 120 and 122 may be integral with inner surface 116, integral with outer surface 115, attached to inner surface 116 or attached to outer surface 115. Further, connectors 120 and 122 may be configured for use with any known means to couple fastener 103 to sleeve 102, including a screw, a bolt and nut, a locking ring or the like. Further still, it should be noted that although two connectors 120, 122 are shown in the embodiments illustrated in the figures, it is contemplated that a single connector or a plurality of connectors may be used to couple fastener 103 to sleeve 102.

Figure 6:
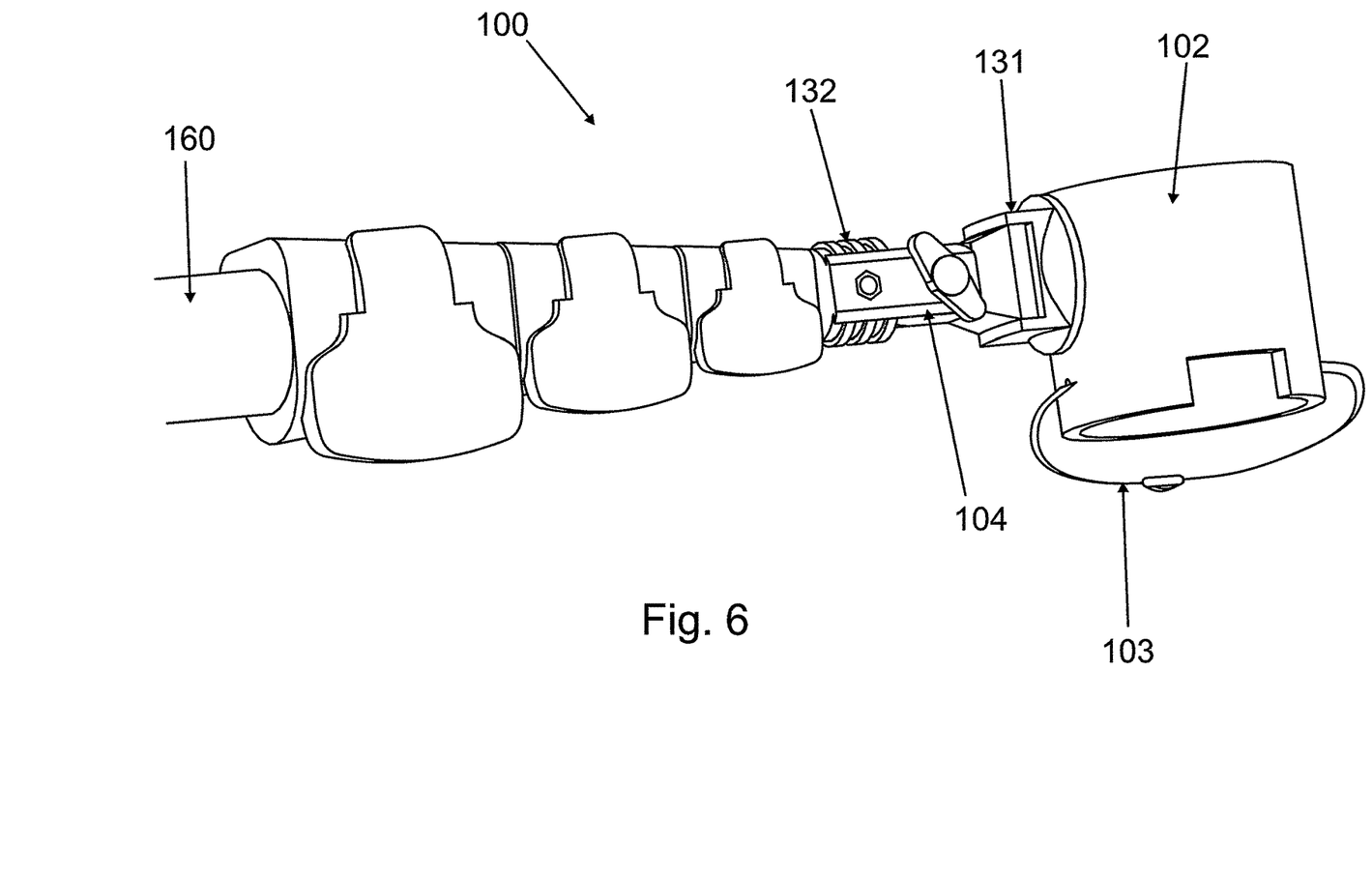
FIG. 6 is a perspective view of the scanning instrument accessory of FIG. 5A in an downward orientation.

As shown in FIG. 3, lower portion 113 of body 110 includes a connector 125 to couple coupling mechanism 104 to sleeve 102. Connector 125 may also be integral with inner surface 116, and/or integral with outer surface 115. In one embodiment, connector 125 is a rotational coupler such that sleeve 102 can rotate about a first axis defined by first end 131 of coupling mechanism 104, as seen in FIG. 6.

FIG. 4 is a top view of sleeve 102 showing outer surface 115, inner surface 116, notch 126 and inner space 111. Operationally, in the embodiment provided in the figures, a scanning instrument 101 is received by inner space 111 such that at least a portion of the scanning instrument 101 rests on top surface 118 of body 110. In other embodiments, the body 110 is configured to receive the scanning instrument 101 such that the scanning instrument 101 is substantially or entirely retained within space 111. Fastener 103, best seen in FIG. 6, is then affixed around the scanning instrument 101 to secure it within sleeve 102.

Figure 5A:
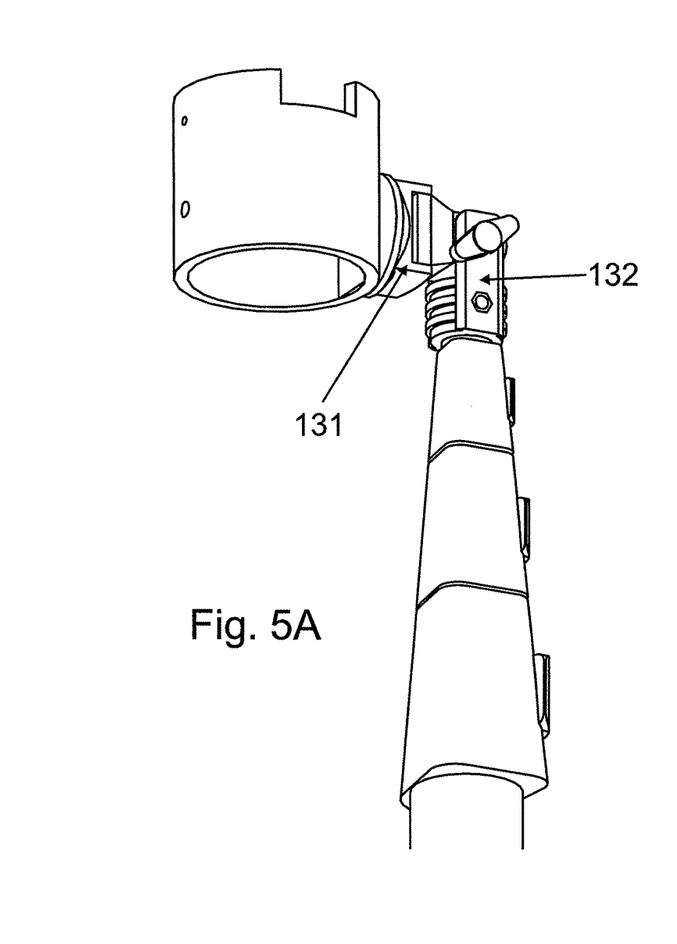
FIG. 5A is perspective view of a sleeve, a fastener and a coupling mechanism of the scanning instrument accessory in accordance with one embodiment of the invention.
Figure 5B:
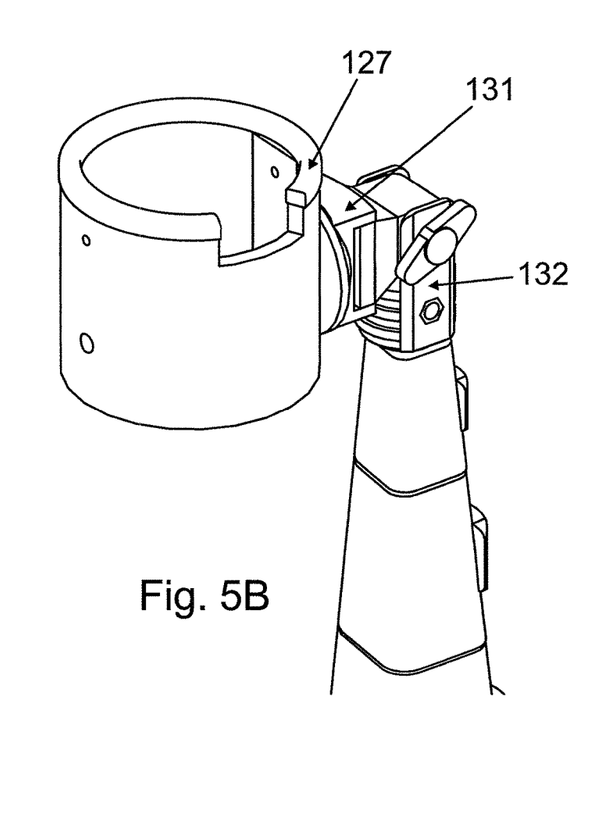
FIG. 5B is a perspective view of a sleeve, a fastener and a coupling mechanism of the scanning instrument accessory in accordance with another embodiment of the application.

FIGS. 5A and 5B illustrate two different embodiments of sleeve 102 and fastener 103. In the embodiment shown in FIG. 5A, fastener 103 is a length-adjustable VELCRO™ strap that is connected to outer surface 115 of sleeve 102. In the embodiment shown in FIG. 5B, fastener 103 is a length-adjustable VELCRO™ strap connected to inner surface 116 of sleeve 102. It should be noted that fastener 103 may be any means to secure the scanning instrument 101 in sleeve 102, including but not limited to an elastic strap, etc. In the embodiments shown in the figures, fastener 103 is length-adjustable to retain and secure scanning instrument 101 of various shapes and sizes in the sleeve 102. Fastener 103 secures the scanning instrument 101 within sleeve 102 so that a user can effectively use the scanning instrument accessory 100 in different orientations without scanning instrument 101 falling out of the sleeve 102. For example, scanning instrument accessory 100 may be used to scan products at various heights and in different orientations.

FIG. 5B further illustrates that sleeve 102 may optionally include a lining 127 to act as a cushion for the scanning instrument 101 as the scanning instrument 101 rests in sleeve 102. Such a lining 127 also reduces noise due to rattling when the accessory is being used, as the scanning instrument 101 may be more securely held. The lining 127 may be made of felt, rubber, foam, or the like, and can substantially cover inner surface 116 and top surface 118 of body 110.

Figure 7:
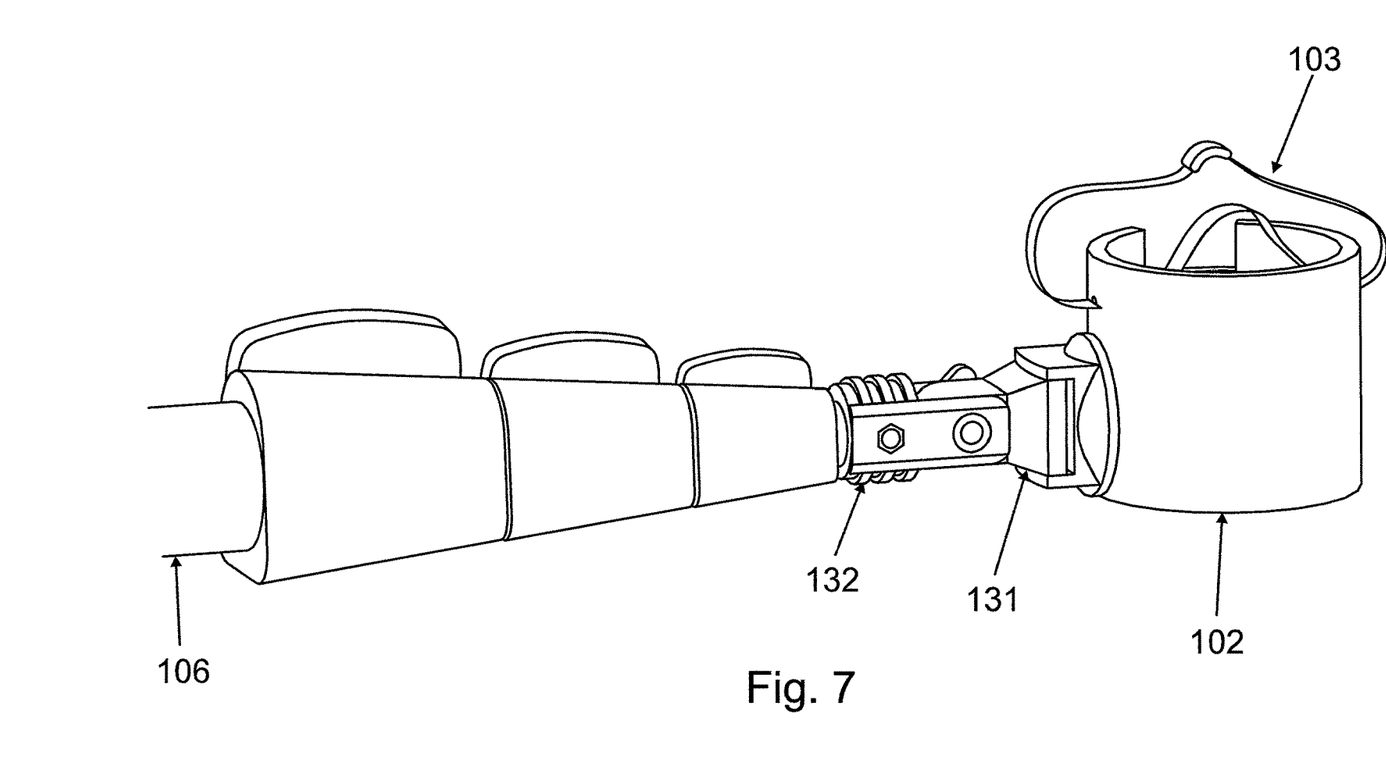
FIG. 7 is a perspective view of the scanning instrument accessory of FIG. 5A in an upward orientation.

FIG. 6 is a prospective view of the scanning instrument accessory 100 in a downward orientation. Similarly, FIG. 7 provides a prospective view of the scanning instrument accessory 100 in an upward orientation. As shown therein, as well as in FIGS. 5A and 5B, coupling mechanism 104 comprises first end 131 and second end 132. Coupling mechanism 104 can generally have an "L" shape, where first end 131 couples to sleeve 102 via connector 124 and second end 132 couples to extension pole 106. As previously described, first end 131 can rotatably couple to sleeve 102 via connector 124 such that sleeve 102 can rotate about an axis defined by first end 131. In the embodiment shown in the figures, first end 131 is transverse to outer surface 115 of sleeve 102. Second end 132 of coupling mechanism 104 is releasably coupled to extension pole 106 as described below such that second end 132 is coaxial with extension pole 106.

Figure 10:
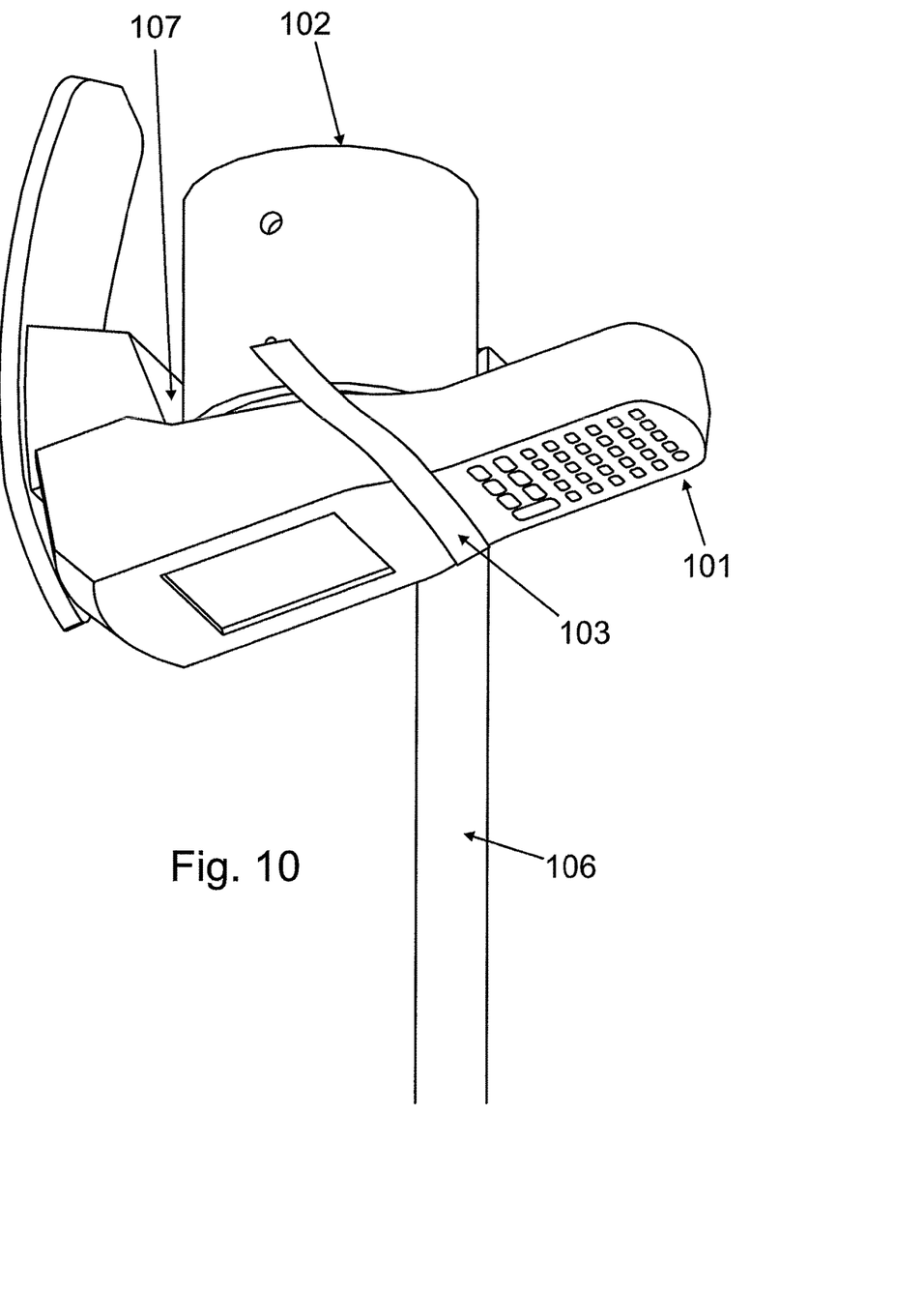
FIG. 10 is a perspective view of a scanning instrument accessory in accordance with an embodiment of the invention in operation with the scanning instrument of FIG. 9.

As mentioned above, first end 131 of coupling mechanism 104 may be rotatably coupled to second end 132 such that first end 131, and subsequently sleeve 102, may rotate about an axis defined by second end 132 and extension pole 106. Rotation of sleeve 102 about the first axis defined by first end 131 and rotation of first end 131 about the second axis defined by second end 132 and extension pole 106 may be by any means known in the art including but not limited to a ball and socket joint, a pin and sleeve configuration, a universal joint, or the like. Such a combination of rotatable couplings allows a user operating the scanning instrument accessory 100 to adjust a position of the scanning instrument 101 such that the scanning instrument 101 may be maintained at several different angles during use. In one example, as best seen in FIG. 10, the combination of rotatable couplings may allow a user operating the scanning instrument accessory 100 to turn the scanner face down in the sleeve 102 so that the user may view a display screen on the scanning instrument 101, even when the scanning instrument 101 is held overhead. This is advantageous as it allows the user to read the scanning instrument 101 from the floor and see changes in counts on the screen, and thereby verify that the scanning instrument 101 is operating properly.

Figure 8:
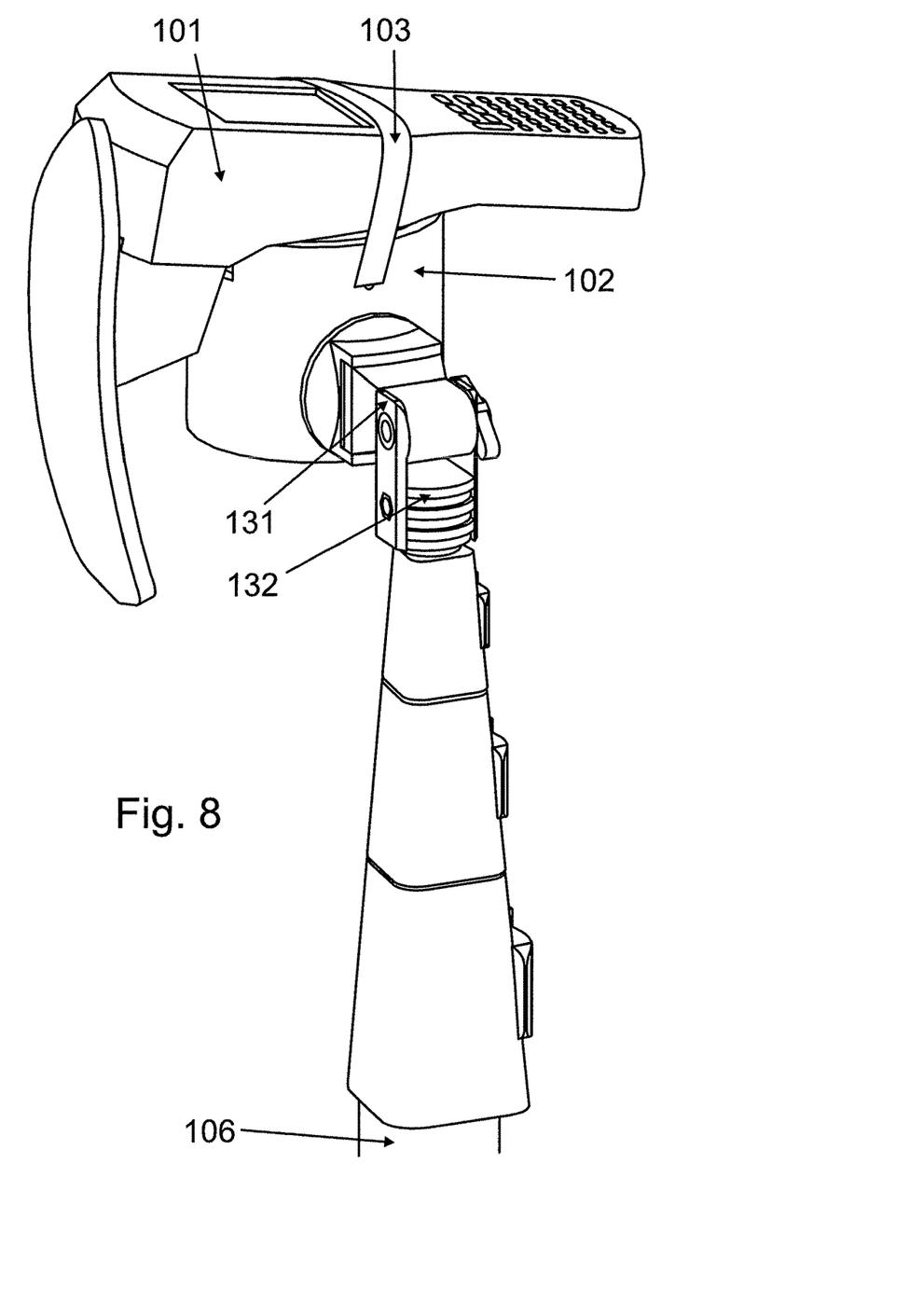
FIG. 8 is a perspective view of a scanning instrument accessory in accordance with an embodiment of the invention in operation with a scanning instrument.
Figure 9:
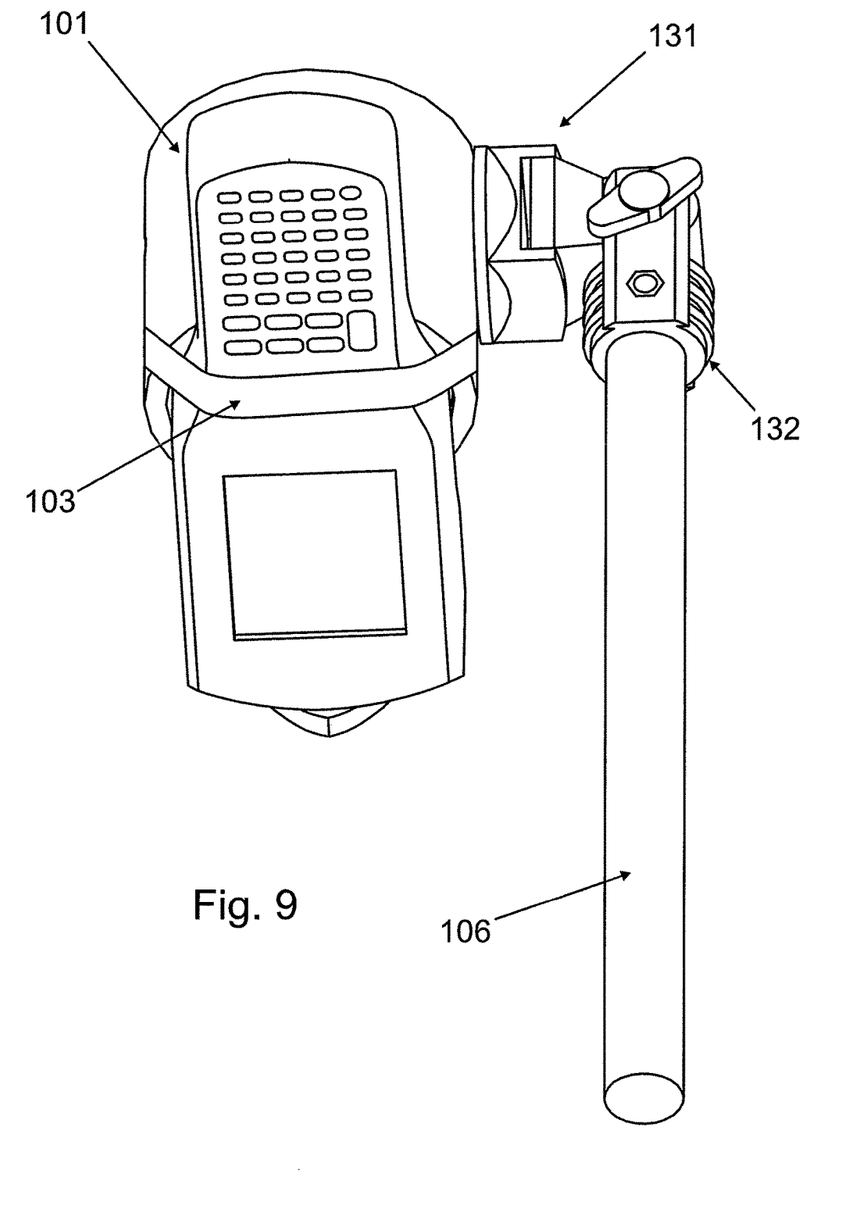
FIG. 9 is a perspective view of a scanning instrument accessory in accordance with an embodiment of the invention in operation with another scanning instrument.

FIGS. 8-10 illustrate operation of the scanning instrument accessory 100 with two different types of scanning instruments 101. As demonstrated therein, the scanning instruments 101 may be placed in a variety of orientations and at a variety of angles, depending on the particular needs of the user and the location of the items to be scanned.

The embodiments of the application described above are intended to be exemplary only. Those skilled in this art will understand that various modifications of detail may be made to these embodiments, all of which come within the scope of the invention.

What is claimed is:

1. An accessory configured to hold a Radio Frequency Identification scanning instrument having a protruding handle, comprising:
   a sleeve to receive the scanning instrument;
   a notch in the sleeve to accommodate said protruding handle;
   a fastener coupled to the sleeve to releasably secure the scanning instrument in the sleeve;
   a coupling mechanism rotatably coupled to the sleeve, the coupling mechanism being configured to permit rotation of the sleeve and the scanning instrument into a direction as selected by a user; and
   an extension pole having an upper end and a lower end, the upper end coupled to the coupling mechanism at the second end;
   wherein the Radio Frequency Identification scanning instrument is configured to use electromagnetic fields to identify and track Radio Frequency Identification tags attached to external objects; and
   wherein the notch is disposed in the sleeve such that, with the RFID scanner accommodated in the sleeve, the protruding handle is spaced from the coupling mechanism and extension pole.

2. The accessory of claim 1, in which the coupling mechanism has a first end and a second end, the first end rotatably coupled to the sleeve such that the sleeve rotates about an axis defined by the first end, the second end rotatably coupled to the first end such that the first end and the sleeve rotate about an axis defined by the second end.

3. The accessory of claim 1, wherein the coupling mechanism further comprises a motion inducer configured to induce a sinusoidal movement of the sleeve with respect to the coupling mechanism and the extension pole wherein the sinusoidal movement is smooth and multipath.

4. The accessory of claim 3, wherein the motion inducer is configured to produce non-rotational movement.

5. The accessory of claim 3, wherein the motion inducer is one of a hydraulic, mechanical and electrical motion inducing device.

6. The accessory of claim 1, further comprising a size-adjustment means connected to the notch for changing the size of the notch.

7. The accessory of claim 1, wherein the lower end of the extension pole is adapted to be connected to a transportation device for moving the accessory.

8. The accessory of claim 7, wherein the extension pole is adapted to be rotatably connected to the transportation device.

9. The accessory of claim 1, further comprising a control device for remotely controlling the scanning instrument, wherein the control device is installed near the lower end of the extension pole.

10. The accessory of claim 9, wherein said control device is connected by a wire to the scanning instrument.

11. The accessory of claim 9, wherein said control device is wirelessly connected to the scanning instrument.

12. A method of scanning one or more items incorporating Radio Frequency Identification tags using the accessory of claim 1, wherein
   the extension pole is connected by its lower end to a transportation device such that the sleeve and the scanning instrument are placed at approximately the same height as a first item incorporating a Radio Frequency Identification tag;

the first item is scanned;

the transportation device is moved so that the accessory can continue scanning further items located at approximately the same height as the first item.

13. The method of claim 12, wherein a sinusoidal movement is used to move the sleeve and the scanner.

14. A method of scanning one or more items incorporating Radio Frequency Identification tags using the accessory of claim 1, wherein a user holds the accessory at the lower end of the extension pole such that the sleeve and the scanning instrument of the accessory are placed at approximately the same height as a first item incorporating a Radio Frequency Identification tag;

the first item is scanned; and the user moves in a horizontal direction so that the accessory can be used to continue scanning further items located at approximately the same height as the first item.

15. The method of claim 14, wherein a sinusoidal movement is used to move the sleeve and the scanner.

\* \* \* \* \*